United States Patent
Kim et al.

(10) Patent No.: US 7,791,649 B2
(45) Date of Patent: Sep. 7, 2010

(54) APPARATUS, MEDIUM, AND METHOD WITH AUTOMATIC WHITE BALANCE CONTROL

(75) Inventors: Sung-su Kim, Yongin-si (KR); Ho-young Lee, Suwon-si (KR); Du-sik Park, Suwon-si (KR); Chang-yeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 965 days.

(21) Appl. No.: 11/356,223

(22) Filed: Feb. 17, 2006

(65) Prior Publication Data
US 2006/0290957 A1 Dec. 28, 2006

(30) Foreign Application Priority Data
Feb. 18, 2005 (KR) .................... 10-2005-0013718

(51) Int. Cl.
*H04N 9/73* (2006.01)
*G06K 9/00* (2006.01)
(52) U.S. Cl. .................. 348/223.1; 382/163; 382/167
(58) Field of Classification Search .............. 348/231.1, 348/241, 222.1
See application file for complete search history.

(56) References Cited
U.S. PATENT DOCUMENTS

| | | | |
|---|---|---|---|
| 6,154,217 A * | 11/2000 | Aldrich ...................... 345/589 |
| 6,377,702 B1 * | 4/2002 | Cooper ...................... 382/167 |
| 6,560,356 B1 * | 5/2003 | Takahashi et al. ........... 382/162 |
| 6,989,859 B2 * | 1/2006 | Parulski ................... 348/223.1 |
| 7,084,881 B1 * | 8/2006 | Chen et al. .................. 345/589 |
| 2002/0036696 A1 * | 3/2002 | Takemoto .................... 348/223 |
| 2003/0098916 A1 * | 5/2003 | Noguchi ..................... 348/272 |
| 2003/0179398 A1 * | 9/2003 | Takano et al. ................ 358/1.9 |
| 2004/0095478 A1 * | 5/2004 | Takano et al. ............. 348/223.1 |
| 2004/0189818 A1 * | 9/2004 | Tsuruoka et al. ......... 348/221.1 |
| 2004/0212546 A1 * | 10/2004 | Dixon et al. ................. 345/1.1 |
| 2004/0212691 A1 * | 10/2004 | Sato ........................ 348/223.1 |
| 2005/0207641 A1 * | 9/2005 | Bala et al. ................... 382/162 |

* cited by examiner

*Primary Examiner*—Sinh Tran
*Assistant Examiner*—Mark Monk
(74) *Attorney, Agent, or Firm*—Staas & Halsey LLP

(57) ABSTRACT

An automatic white balance control image apparatus, medium, and method. The automatic white balance control imaging apparatus may include a color space conversion unit converting the input image data into color space data having a chromatic component, a gray region extraction unit extracting a gray region for the input image data based on gray regions for light sources, the gray regions being detected based on plural light sources and a predetermined color checker, a detection unit extracting initial light source information using a color gamut average value and a color gamut center value, and adjusting the initial light source information in order for a chromatic component introduced into the extracted gray region to be excluded, a gain control unit calculating gains to scale the input image data based on the adjusted initial light source information, and controlling a white balance by applying the calculated gains to the input image data.

31 Claims, 10 Drawing Sheets

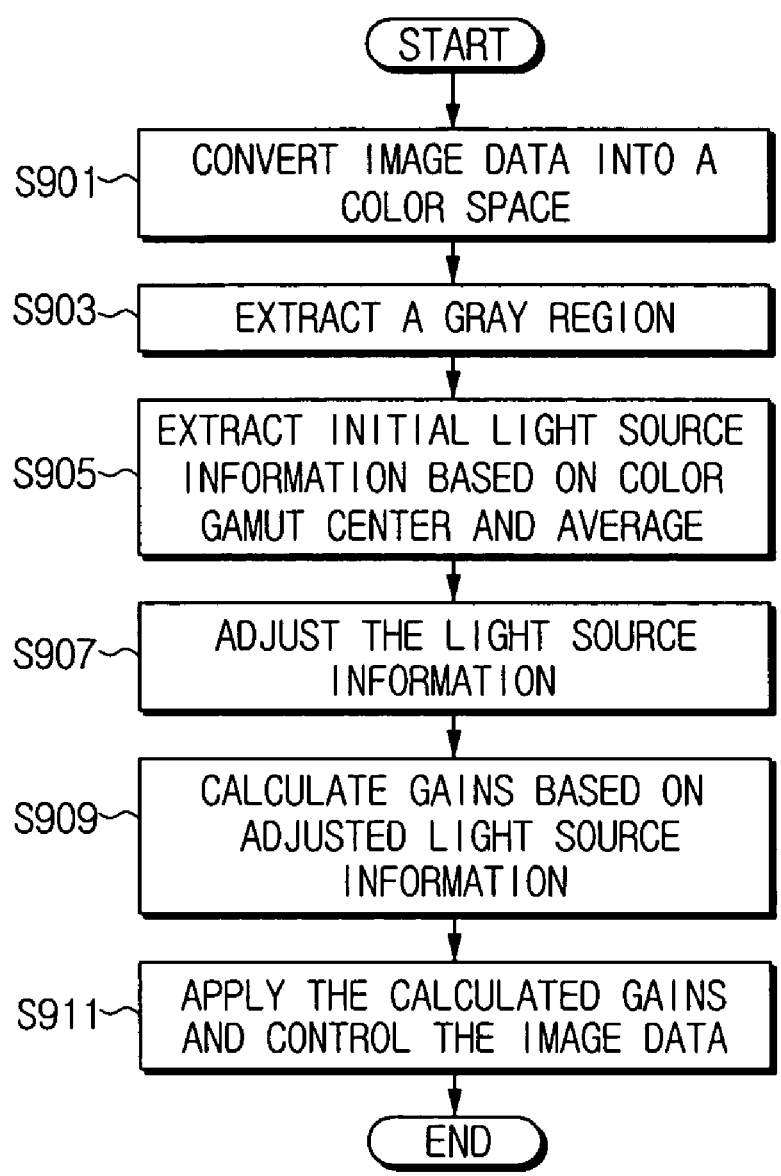

FIG. 8B
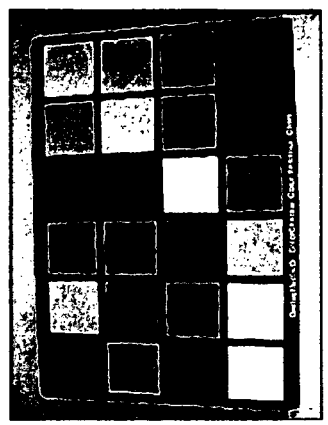
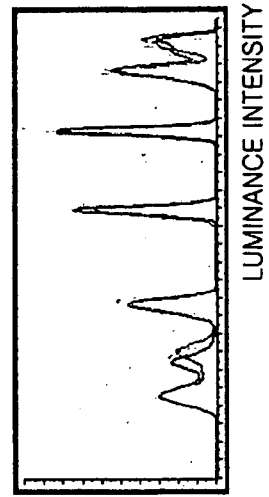
$D_{50}$
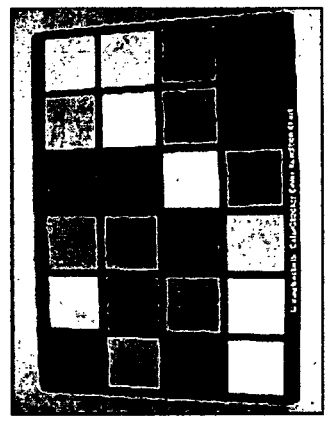
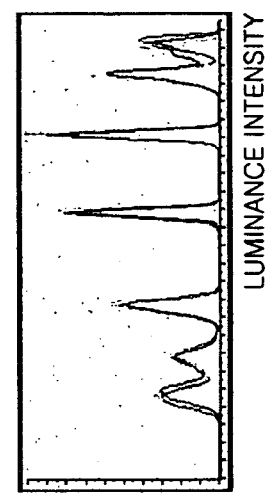
CWF
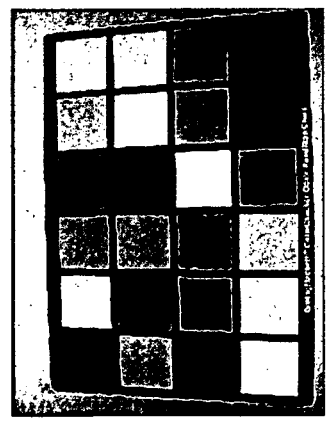
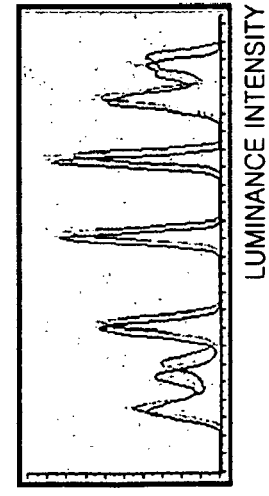
A

APPARATUS, MEDIUM, AND METHOD WITH AUTOMATIC WHITE BALANCE CONTROL

CROSS-REFERENCE TO RELATED APPLICATIONS

This application claims benefit under 35 U.S.C. §119 from Korean Patent Application No. 2005-13718, filed on Feb. 18, 2005, the entire contents of which is incorporated herein by reference.

BACKGROUND OF THE INVENTION

1. Field of the Invention

Embodiments of the present invention relate to an apparatus, medium, and method with automatic white balance control capable of detecting accurate light sources by minimizing a chromatic component introduced into a gray region and automatically controlling a white balance based on detected light source information having the color component being extracted from a chromatic color space.

2. Description of the Related Art

White balance control refers to a color control function of adjusting a color balance in a captured image or video by a shift of overall color tones through a detecting of the white color suffering the largest changes to an object color, due to light sources in an input image data, deciding a color temperature by RGB component ratios of the detected white color, and controlling red and blue colors R and B, according to the color temperature, and based on the detected white color.

Generally, even when an identical object is image-captured by an imaging apparatus such as a digital still camera, digital video camera, or the like, the captured image colors look different depending on circumstances surrounding various related image light sources, such as an incandescent room lamp, fluorescent lamp, sun light, or the like. Human eyes have color constancy enabling humans to sense a white color, as the white color, by adapting the eyes to each light source, but an imaging apparatus reproduces white color such that a blue color is included when the color temperatures of the light sources are high or a red color is included when the color temperatures are low, since RGB components are reflected by the light sources having different color temperatures.

Accordingly, white balance control is needed in order for a white color to be properly sensed as the white color, e.g., when the color temperature changes due to changes in light sources. For example, a white color containing a blue color may need to be controlled such that the gain of a red color R is increased and the gain of the blue color B is decreased, or a white color containing a red color may need to be controlled such that the gain of the blue color B is increased and the gain of the red color R is decreased.

Such an accurate control over the white balance requires an accurate detection of a reference white color. For this purpose, the white balance can be controlled based on a gray world assumption, stating that integrating whole color components of a captured image results in a zero, that is, a color close to an achromatic color. Specifically, white balance control under the gray world assumption can effectively detect a white color if an input image has a wide range of diverse colors. It is necessary in white balance control, under the gray world assumption, to accurately control white balance with acquisition of accurate information about light sources even when there exists a dominant color in an input image or a chromatic component is introduced into an extracted gray region.

SUMMARY OF THE INVENTION

Embodiments of the present invention, as at least discussed herein, have been developed in order to solve the above drawbacks and other problems associated with such conventional arrangements.

An embodiment of the present invention provides an apparatus, medium, and method of automatic white balance control capable of accurately controlling white balance by minimizing a chromatic component introduced to a gray region, extracted out of an chromatic color space, and using light source information detected by excluding a dominant color existing in an input image.

To achieve the above and/or other aspects and advantages, embodiments of the present invention include an apparatus with automatic white balance control, including a color space conversion unit to convert input image data captured by an image sensor into color space data having a chromatic component, a gray region extraction unit to extract a gray region for the input image data based on gray regions for light sources related to the input image data, the gray regions being identified based on plural light sources and a predetermined color checker, a detection unit to extract initial light source information by using a color gamut average value and a color gamut center value of the input image data, and adjust the initial light source information to exclude a chromatic component introduced into the extracted gray region by using a determined existence of a luminance difference between a gray component and the chromatic component, and a gain control unit to calculate gains to be applied to scale the input image data based on the adjusted initial light source information, and control a white balance of the input image data by applying the calculated gains to the input image data.

The apparatus may further include signal-processing unit for signal-processing and displaying the white-balanced input image, and/or a charge coupled device (CCD), with the CCD being the image sensor and providing the input image data.

The color space may either be a color space having a luminance (Y) axis, an R/R+G+B axis, and a B/R+G+B axis or a color space having a luminance (Y) axis, an R/G axis, and a B/G axis.

The gray region extraction unit may detect a white point for each light source based on an average value of gray patch data obtained by using the plural light sources, detects a certain range about a respective white point for each light source as a respective gray region of each light source, and extracts a region including all the gray regions for the plural light sources as the gray region of the input image.

The detection unit may include a light source information extraction unit to calculate a weighted average value on which the color gamut average value is reflected, based on the color gamut average value and color gamut center value of the input image, and extract the initial light source information based on the weighted average value, and an adjustment unit to divide the gray region into a first region of low luminance and a second region of high luminance by using the determined existence of the luminance difference between the gray component and the chromatic component, and adjust the initial light source information based on an average value of the first region and an average value of the second region.

The light source information extraction unit may vertically map the weighted average value onto a center axis connecting white points of the plural light sources, corrects the weighted average value mapped onto the center axis based on movement enabling errors to be minimized when mapping a weighted average value of each light source onto a white point for each light source, and extract the corrected weighted average value as the initial light source information.

Weighted average values may be calculated according to:

$$r_{weighted} = (\alpha \times r_{ave} + \beta \times r_{gm})/(\alpha+\beta)$$

$$b_{weighted} = (\beta \times b_{ave} + \beta \times b_{gm})/(\alpha+\beta),$$

Here, $r_{weighted}$ denotes an R/R+G+B value of the weighted average value, $b_{weighted}$ denotes a B/R+G+B value of the weighted average value, $\alpha$ and $\beta$ denote constants, respectively, $r_{ave}$ denotes an R/R+G+B value of the color gamut average value, and $b_{ave}$ denotes a B/R+G+B value of the color gamut average value.

The adjustment unit may divide the gray region into the first region and the second region based on a threshold luminance value determined by using an average value of maximum and minimum values in the gray region and an average value of the gray region, and adjust the initial light source information by using the average value of the first region and the average value of the second region.

The threshold luminance value may be calculated according to:

$$Y_{threshold} = (\alpha \times Y_{region} + \beta \times Y_{ave})/(\alpha+\beta),$$

Here, $Y_{threshold}$ denotes the threshold luminance value, $Y_{region}$ denotes an average value of the average values of the first and second regions, $Y_{ave}$ denotes the average value of the gray region, and $\alpha$ and $\beta$ are an arbitrary constants.

The adjustment unit may selectively detect, as the adjusted light source information, either the average value of the first region or the average value of the second region located according to a shortest distance to the initial light source information.

The adjusted light source information may be calculated according to:

$$r_{wht} = r_{down}, b_{wht} = b_{down} \text{ if Dist}_{up} > \text{Dist}_{down}$$

$$r_{wht} = r_{up}, b_{wht} = b_{up} \text{ if Dist}_{up} < \text{Dist}_{down},$$

Here, $r_{wht}$ and $b_{wht}$ denote R/R+G+B and B/R+G+B values of the adjusted light source information, respectively, $r_{down}$ and $b_{down}$ denote R/R+G+B and B/R+G+B values of the average value of the first region, and $r_{up}$ and $b_{up}$ denote R/R+G+B and B/R+G+B values of an color gamut average value of the second region, respectively, and $\text{Dist}_{up}$ and $\text{Dist}_{down}$ denote a distance from the initial light source information to the average value of the second region and a distance from the initial light source information to the average value of the first region, respectively.

The gains may be calculated according to:

$$R_{gain} = f_{scaling} \times \frac{g_{wht}}{r_{wht}} \qquad \text{Equation 6}$$

$$B_{gain} = f_{scaling} \times \frac{g_{wht}}{b_{wht}},$$

Here, $R_{gain}$ and $B_{gain}$ denote gains to be applied to a red color R and a blue color B, respectively, $f_{scaling}$ denotes a scaling factor for scaling the input image, and $r_{wht}$ and $b_{wht}$ denote R/R+G+B and B/R+G+B values of the adjusted light source information, respectively.

The gain control unit may control the white balance for the input image by multiplying the red color R of the input image by a reciprocal number of the scaling factor and the calculated gain of the red color R and multiplying the blue color B of the input image by the reciprocal number of the scaling factor and the calculated gain of the blue color B.

To achieve the above and/or other aspects and advantages, embodiments of the present invention include an automatic white balance control method, including converting input image data captured by an image sensor into color space data having a chromatic component, extracting a gray region for the input image data based on gray regions of light sources, the gray regions being identified based on plural light sources related to the input image data and a predetermined color checker, extracting initial light source information by using a color gamut average value and a color gamut center value of the input image data, and extracting final light source information by adjusting the initial light source information to exclude a chromatic component introduced into the extracted gray region by using a determined existence of a luminance difference between a gray component and the chromatic component, and calculating gains to be applied to scale the input image data based on the adjusted final light source information, and controlling a white balance of the input image data by applying the calculated gains to the input image data.

The method may further include signal-processing and displaying the white-balanced input image, and/or providing the input image data from a charge coupled device (CCD) as the image sensor.

The color space may either a color space having a luminance (Y) axis, an R/R+G+B axis, and a B/R+G+B axis or a color space having a luminance (Y) axis, an R/G axis, and a B/G axis.

The extracting of the gray region may include detecting a white point for each light source based on an average value of gray patch data obtained by using plural light sources, and extracting, as the gray region of the input image, a region including all respective gray regions for the plural light sources by detecting a certain respective range about a white point of each respective light source as a respective gray region of each light source.

The extracting of the final light source information may include calculating a weighted average value on which the color gamut average value is reflected, based on the color gamut average value and color gamut center value of the input image data, and extracting the initial light source information based on the weighted average value, and dividing the gray region into a first region of low luminance and a second region of high luminance by using the determined existence of the luminance difference between the gray component and the chromatic component, and adjusting the initial light source information based on average values of the first region and an average value of the second region.

The extracting of the light source information may further include vertically mapping the weighted average value onto a center axis connecting white points of the plural light sources, correcting the weighted average value mapped onto the center axis based on movement enabling errors to be minimized when mapping a weighted average value of each light source onto a white point for each light source, and extracting the corrected weighted average value as the initial light source information.

The weighted average values may be calculated according to:

$$r_{weighted} = (\alpha \times r_{ave} + \beta \times r_{gm})/(\alpha+\beta)$$

$$b_{weighted} = (\alpha \times b_{ave} + \beta \times b_{gm})/(\alpha+\beta),$$

Here, $r_{weighted}$ denotes an R/R+G+B value of the weighted average value, and $b_{weighted}$ denotes a B/R+G+B value of the weighted average value, $\alpha$ and $\beta$ denote constants, respectively, $r_{ave}$ denotes an R/R+G+B value of the color gamut average value, and $b_{ave}$ denotes a B/R+G+B value of the color gamut average value.

The adjusting of the initial light source information may include dividing the gray region into the first region and the second region based on a threshold luminance value decided by using an average value of maximum and minimum values in the gray region and an average value of the gray region, and adjusting the initial light source information by using the average value of the first region and the average value of the second region.

The threshold luminance value may be calculated according to:

$$Y_{threshold} = (\alpha \times Y_{region} + \beta \times Y_{ave})/(\alpha + \beta),$$

Here, $Y_{threshold}$ denotes the threshold luminance value, $Y_{region}$ denotes an average value of the average values of the first and second regions, $Y_{ave}$ denotes the average value of the gray region, and α and β denote arbitrary constants.

The adjusting of the initial light source information may include detecting as the adjusted light source information either the average value of the first region or the average value of the second region located in a shortest distance to the initial light source information.

The adjusted light source information may be calculated according to:

$$r_{wht} = r_{down}, b_{wht} = b_{down} \text{ if } Dist_{up} > Dist_{down}$$

$$r_{wht} = r_{up}, b_{wht} = b_{up} \text{ if } Dist_{up} < Dist_{down},$$

Here, $r_{wht}$ and $b_{wht}$ denote R/R+G+B and B/R+G+B values of the adjusted light source information, respectively, $r_{down}$ and $b_{down}$ denote R/R+G+B and B/R+G+B values of the average value of the first region, and $r_{up}$ and $b_{up}$ denote R/R+G+B and B/R+G+B values of an color gamut average value of the second region, respectively, and $Dist_{up}$ and $Dist_{down}$ denote a distance from the initial light source information to the average value of the second region and a distance from the initial light source information to the average value of the first region, respectively.

The gains may be calculated according to:

$$R_{gain} = f_{scaling} \times \frac{g_{wht}}{r_{wht}} \qquad \text{Equation 6}$$

$$B_{gain} = f_{scaling} \times \frac{g_{wht}}{b_{wht}},$$

Here, $R_{gain}$ and $B_{gain}$ denote gains to be applied to a red color R and a blue color B, respectively, $f_{scaling}$ denotes a scaling factor for scaling the input image, and $r_{wht}$ and $b_{wht}$ denote R/R+G+B and B/R+G+B values of the adjusted light source information, respectively.

The controlling of the white balance may include controlling the white balance for the input image by multiplying the red color R of the input image by a reciprocal number of the scaling factor and the calculated gain of the red color R and multiplying the blue color B of the input image by the reciprocal number of the scaling factor and the calculated gain of the blue color B.

To achieve the above and/or other aspects and advantages, embodiments of the present invention include an least one medium including computer readable code to implement a method embodiment of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 illustrates a white balance control method for an imaging device, for example, according to an embodiment of the present invention; and FIGS. 8A and 8B illustrate histograms for gray patches after white balance control according to an embodiment of the present invention.

DETAILED DESCRIPTION OF THE PREFERRED EMBODIMENTS

Figure 1:
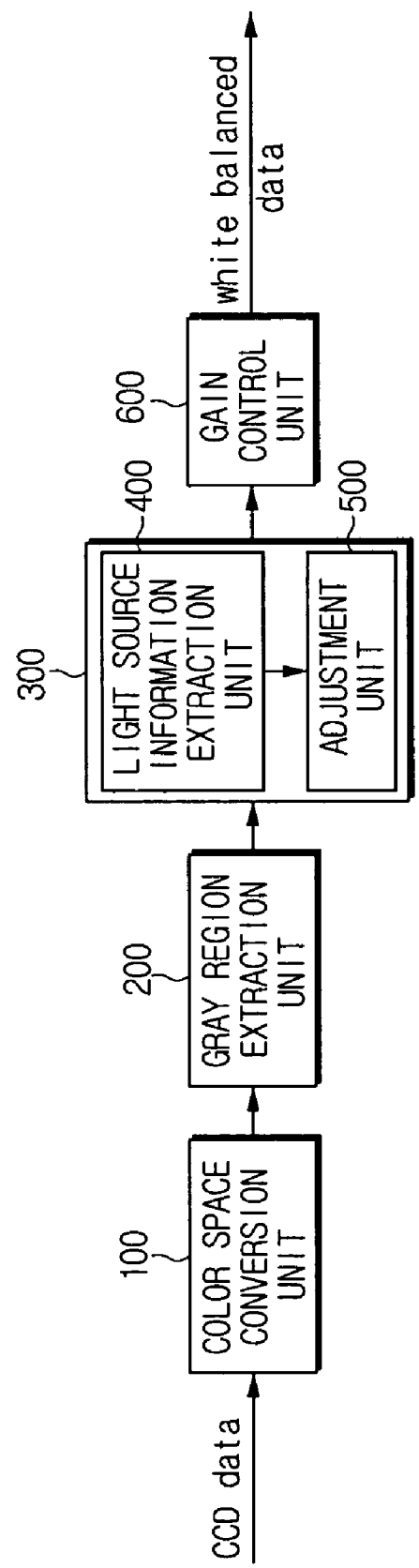
FIG. 1 illustrates an apparatus with white balance control, such as an imaging device, according to an embodiment of the present invention.

Reference will now be made in detail to some embodiments of the present invention, examples of which are illustrated in the accompanying drawings, wherein like reference numerals refer to the like elements throughout. Embodiments are described below to explain the present invention by referring to the figures.

FIG. 1 illustrates an apparatus with white balance control, e.g., an imaging device, according to an embodiment of the present invention.

As illustrated in FIG. 1, white balance control in an imaging device may include a color space conversion unit 100, a gray region extraction unit 200, a detection unit 300, and a gain control unit 600, for example. Here, the detection unit 300 may further include a light source information extraction unit 400 and an adjustment unit 500, for example.

The color space conversion unit 100 may convert input image data into data for a chromatic color space. Since a gray color, out of actual color components, is a color that effectively reflects changes in the circumstances of relative light sources, the color space conversion unit 100 may convert the input image data into the chromatic color space facilitating detection of a gray region. That is, the color space conversion unit 100 may convert a CCD output RGB value into data for the chromatic color space for an easy gray region detection to control white balance of the CCD output RGB value, as an output value of an image sensor.

The chromatic color space can be a color space having a luminance axis, an R/(R+G+B) axis, and a B/(R+G+B) axis or a color space having a luminance axis, an R/G axis, and a B/G axis, for example. That is, since ratios between RGB components of a gray color vary when a color cast is created by light sources, input image data can be converted into the chromatic color space using the ratios between the RGB components of a CCD output RGB value as coordinate axes.

The gray region extraction unit 200 may extract a range of a gray region based on data of gray patches acquired by using plural light sources, for example. Here, the plural light sources can be denoted as reference numerals D65, D50, CWF, A, and so on, for example, noting that the accuracy of extraction of the gray region can be improved as the number of light sources is increased.

The gray region extraction unit 200 may acquire data for the gray patches of a Macbeth Color Checker, for example, for the plural light sources, and identify, as a white color for each light source, an average value of the acquired gray patch data. Further, the gray region extraction unit 200 may identify, as a gray region for each light source, a certain region about a white point of each light source, using distribution characteristics of each light source, and extract, as a gray region for an input image, a region containing all the identified gray regions for the light sources.

The light source information extraction unit 400 may extract initial light source information, e.g., using a color gamut center value and an average value of the input image. The light source information extraction unit 400 may calculate the color gamut center value and average value, if there exists a large difference between the center value and the average value, calculate a weighted average value by applying a weight value to the calculated average value, and use the calculated weighted average values in extracting the initial light source information. The light source information extraction unit 400 may vertically map, for example, the calculated weighted average value onto a light locus, being a center axis connecting the white points of the light sources identified by the gray region extraction unit 200, and extract finalized initial light source information from the vertically mapped light locus.

The adjustment unit 500 may adjust the initial light source information in order to exclude a chromatic component introduced into the gray region, e.g., extracted by the gray region extraction unit 200, and extract the final light source information. Here, for the extraction of the final light source information, the adjustment unit 500 may divide the gray region based on a threshold luminance value, using the existence of a difference between the gray component and the chromatic component, and identify a final white point based on average values of the divided gray regions. The adjustment unit 500 may extract, as adjusted light source information, an average value of regions, out of the divided gray regions, not containing the chromatic component.

Further, the adjustment unit 500 may divide the gray region into smaller regions in order to extract more accurate light source information. Furthermore, if an image having a single background color is input, the adjusting unit 500 can detect a highlighted region by further dividing again the gray regions of the divided gray regions, and extracts more accurate light source information by determining an average value of the highlighted region when adjusting the light source information.

The gain control unit 600 may calculate gains for adjusting input image data by using the final light source information, for example, as decided by the adjustment unit 500, and adjust the white balance by applying the calculated gains to the input image data.

Figure 2A:
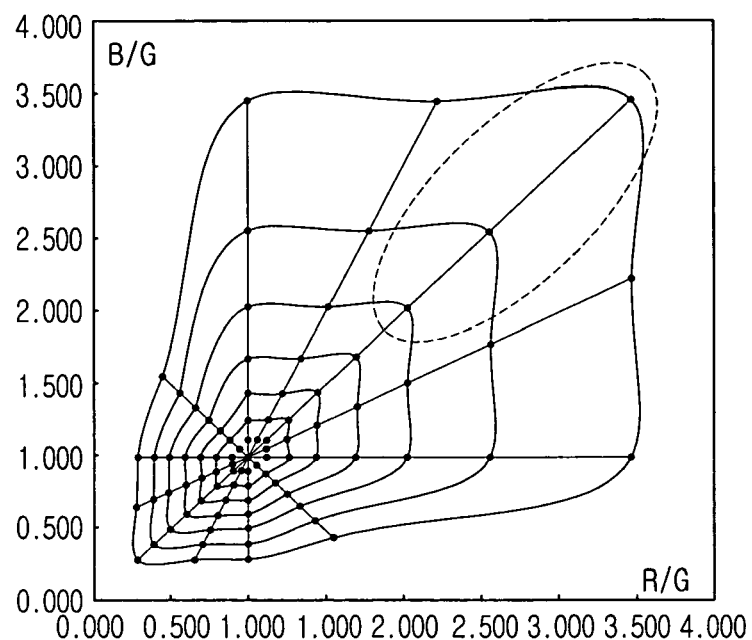
FIGS. 2A and 2B illustrate operations of a color space conversion unit, such as that of FIG. 1, according to embodiments of the present invention.
Figure 2B:
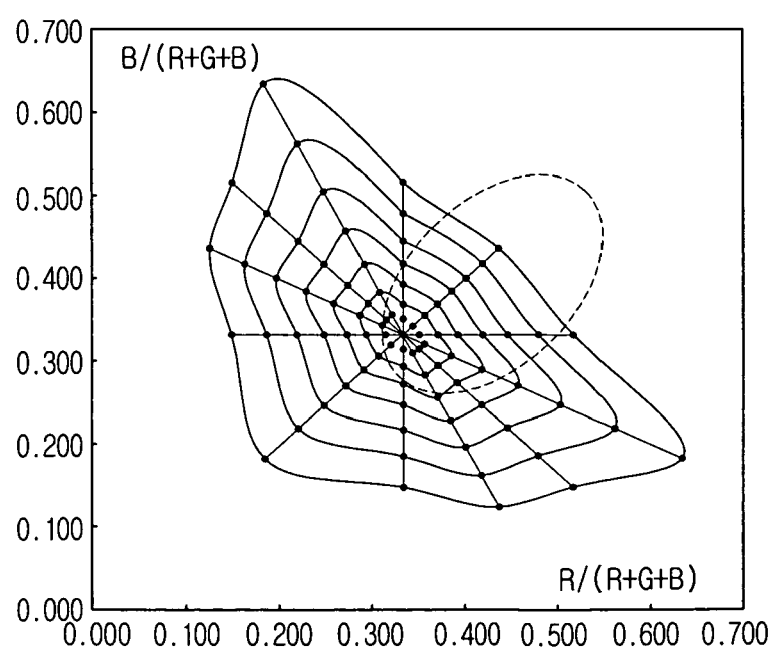

FIGS. 2A and 2B illustrate operations of a color space conversion unit 100, such as that of FIG. 1, according to embodiments of the present invention. FIG. 2A illustrates a distribution of the image data when the R, G, and B color components are uniformly increased in the chromatic color space of an R/G and B/G plane having a fixed luminance. Further, FIG. 2B illustrates a distribution of the image data when the R, G, and B color components are uniformly increased in the chromatic color space of an R/(R+G+B) and B/(R+G+B) plane having a fixed luminance.

In FIG. 2A, generally, an imaging apparatus does not use all of the Charge Coupled Device (CCD) data, for example, but performs sampling over the CCD data at certain intervals and uses patching data based on an average value of the CCD data in a predetermined window about the sampled data. Since an average value of the gray region can be considered a white point, the gray region can be first extracted for extraction of the light source information, i.e. the white point, based on such patching data. Further, the chromatic color space of the R/G and B/G plane can, as shown in FIG. 2A, be used since the ratios between the RGB components of a gray color vary when a color cast is created due to the light source.

In FIG. 2B, since the image data is relatively uniformly distributed compared to the chromatic color space shown in FIG. 2A, as the RGB components of each color component are uniformly increased, the accuracy of the extraction of the gray region can be improved. Thus, hereinafter, information on the light sources may be extracted based on the chromatic color space on the R/(R+G+B) and B/(R+G+B) plane having a fixed luminance as shown in FIG. 2B, for example.

Figure 3A:
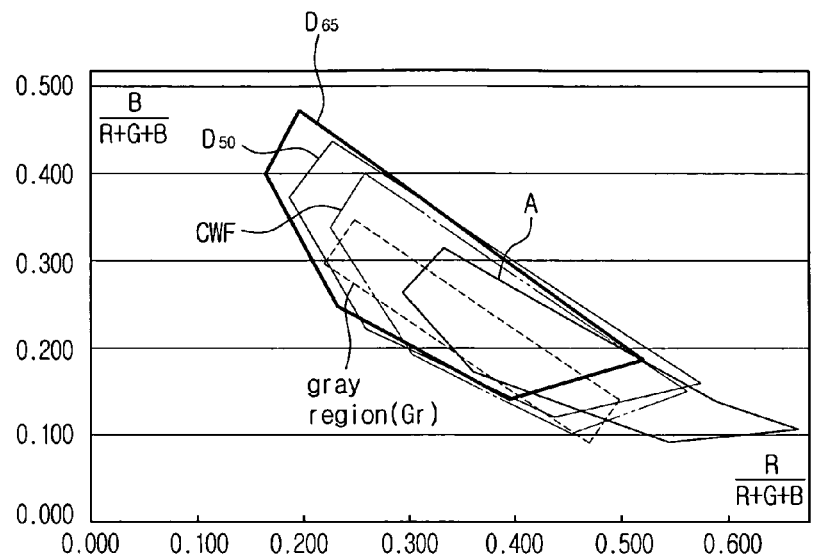
FIGS. 3A to 3C illustrate operations of a gray region extraction unit, such as that of FIG. 1, according to embodiments of the present invention.
Figure 3B:
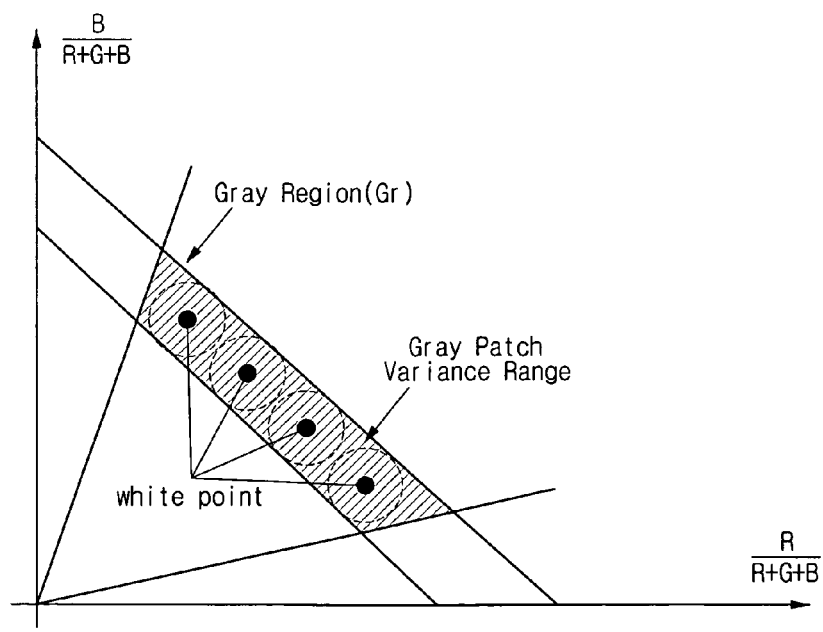
Figure 3C:
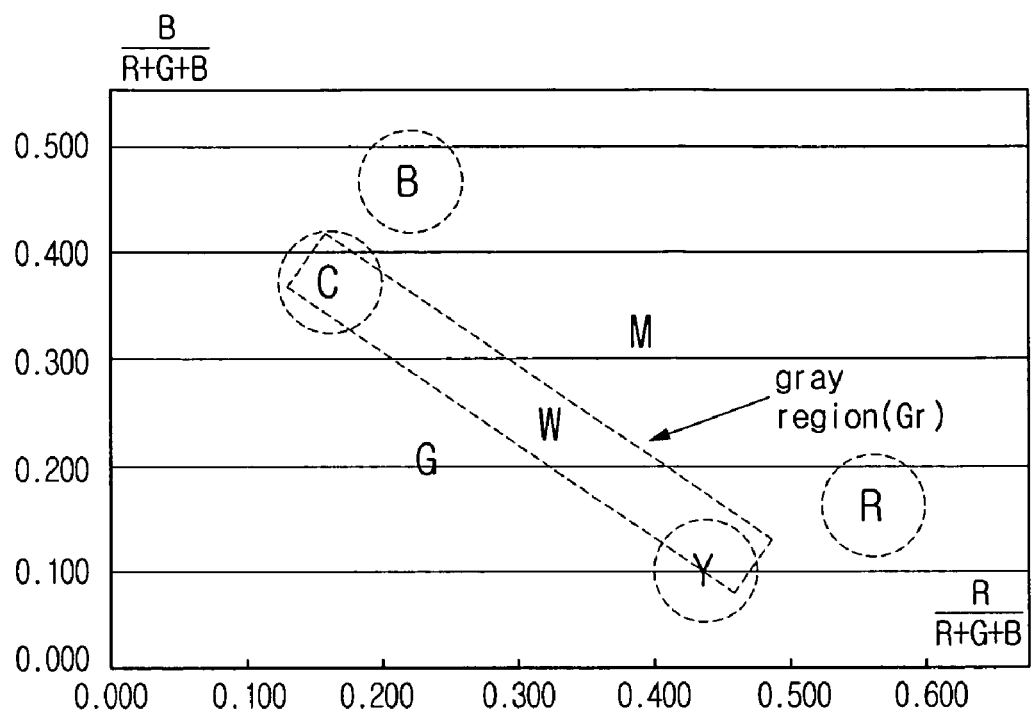

FIGS. 3A to 3C illustrate operations of a gray region extraction unit 200, such as that of FIG. 1, according to embodiments of the present invention. FIG. 3A illustrates a color gamut for four light sources, in general, and FIG. 3B illustrates gray regions for four light sources. Further, FIG. 3C is illustrates the introduction of the chromatic component into the detected gray region for an imaging apparatus. Here, in FIGS. 3A-3C, the reference numeral Gr is used to denote gray regions for the imaging apparatus.

In FIG. 3A, a color gamut of each light source can be detected based on image data of a color checker obtained by using each light source. Here, the four light sources have been denoted as D65, D50, CWF, and A, noting that other light sources may similarly be used for extraction of a color gamut of the input image.

In FIG. 3B, from the color gamut, e.g., as detected for the four light sources, the gray region for each light source may be detected based on gray patch data for a color checker. An average value of the gray patch data for the color checker, detected for each light source, can correspond to a white point. Thus, the white point for each light source can be detected, and then a gray patch variance range is formed about the white point for each light source. Further, a modeling gray region for the input image can be obtained through four straight lines, for example, including all the gray variance ranges for the four light sources.

In FIG. 3C, the chromatic component can be introduced, e.g., due to changes to the light sources, into the gray region for the input image data decided based on the color gamut information of the color checker and the four light sources, e.g., as shown in FIGS. 3A and 3B. That is, since a gray region is more widely extracted than the gray region variance range for the light sources, used for an actual input image, as the gray region is extracted for the input image data caused by the different light sources, as shown in FIG. 3B, a chromatic component such as cyan can be introduced into the gray region. As shown in FIG. 3C, the chromatic components such as yellow and cyan families have been relatively further introduced into the gray region compared to the chromatic components such as blue, red, magenta, and green families. Now, as will be discussed below, and according to embodiments of the present invention, there is a desire to control extracted light source information in order to exclude the chromatic components introduced into the gray region.

Figure 4:
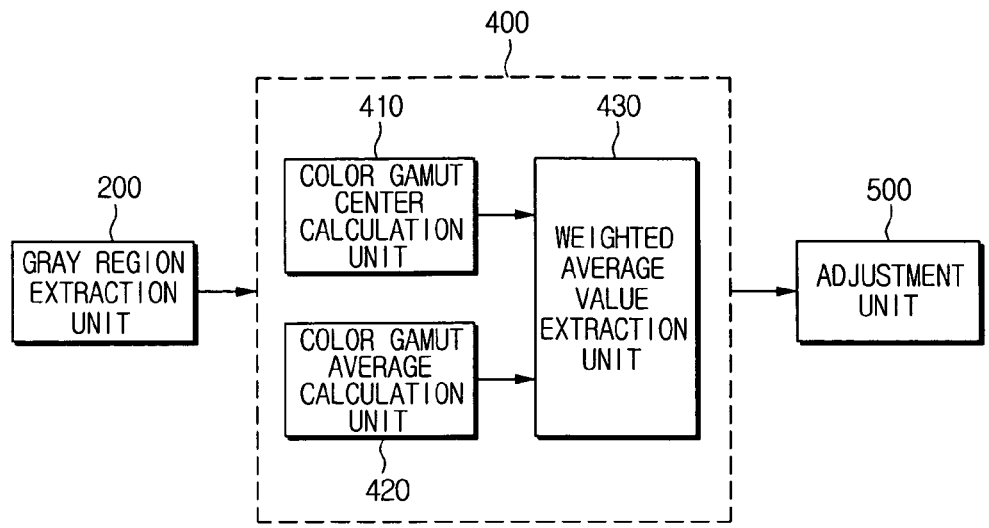
FIG. 4 illustrates a detection unit, such as that of FIG. 1, according to an embodiment of the present invention.

FIG. 4 illustrates a detecting unit 300, such as that of FIG. 1, according to an embodiment of the present invention.

In FIG. 4, the aforementioned detecting unit 300 may include a light source information extraction unit 400 and an adjustment unit 500, and the light source information extraction unit 400 may further include a color gamut center calculation unit 410, a color gamut average calculation unit 420, and weighted average extraction unit 430.

The gamut center calculation unit 410 may obtain a modeling light locus, being a center axis connecting white points for the light sources calculated in the gray region extraction unit 200, and calculate a color gamut center value based on two outermost points, for example, of a color gamut detected by intersection points of an extended line of a modeling center axis and the R/(R+G+B) and B/(R+G+B) axes, for example.

The gamut average calculation unit 420 may calculate the color gamut average value of the color gamut for the input image, and the weighted average extraction unit 430 may calculate a weighted average value based on the color gamut center value, e.g., as calculated in the color gamut center calculation unit 410, and the color gamut average value, e.g., as calculated in the color gamut average calculation unit 420. Here, the weighted average value can be an average value calculated by application of a weighting factor to the color gamut average value, for example, based on a difference between the calculated color gamut average value and color gamut center value.

The adjustment unit 500 may detect the gray region by applying a different light source to the initial light source information, e.g., as extracted in the light source information extraction unit 400, and identify final light source information by excluding the chromatic component introduced into the gray region.

Figure 5A:
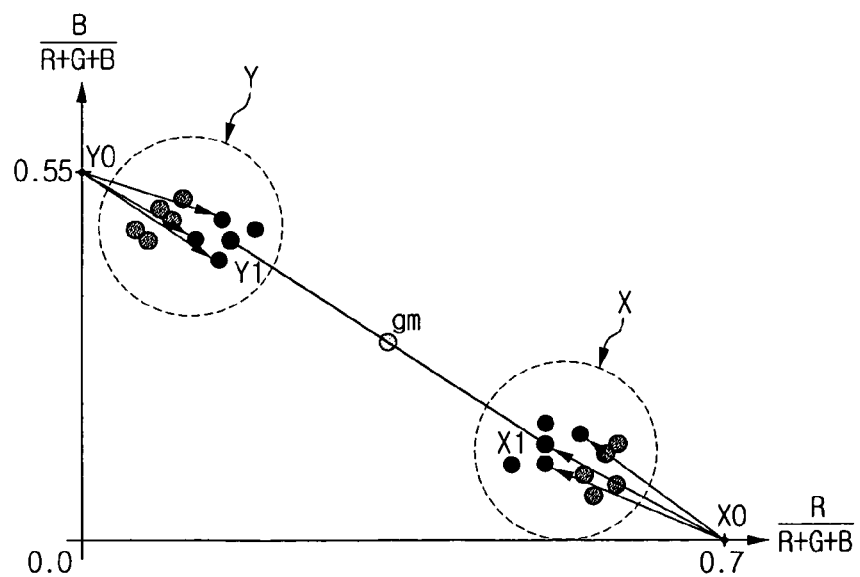
FIGS. 5A to 5C illustrate operations of a light source information extraction unit, such as that of FIG. 1, according to embodiments of the present invention.
Figure 5B:
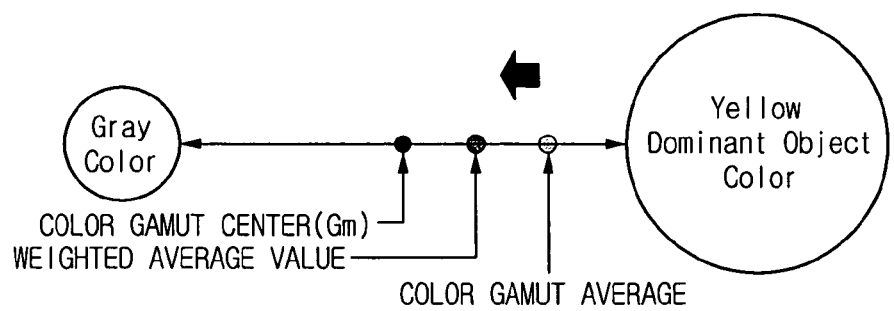
Figure 5C:
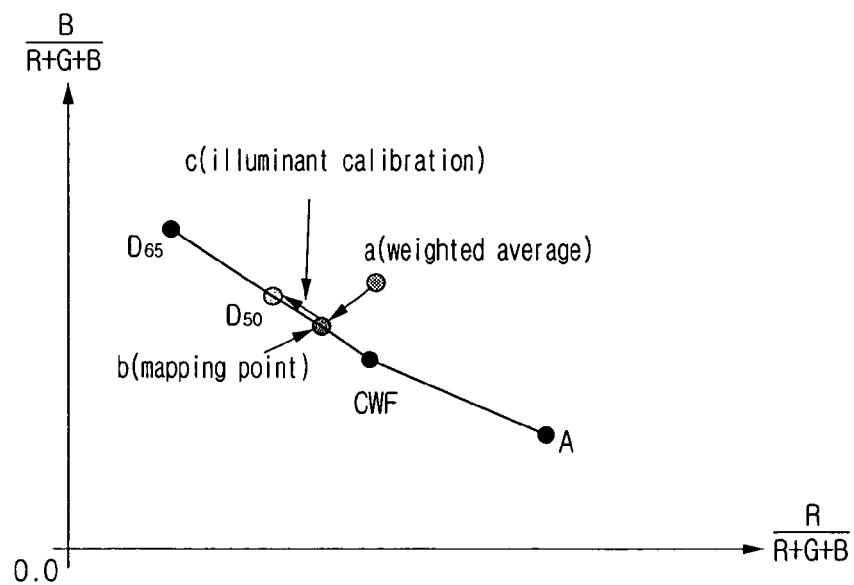

FIGS. 5A to 5C further illustrate operations of a light source information extraction unit 400, such as that of FIG. 1, according to embodiments of the present invention. FIG. 5A illustrates operations of the color gamut center calculation 410, and FIG. 5B illustrates operations of the weighted average extraction unit 430. FIG. 5C illustrates operations for acquiring the initial light source information decided based on the weighted average value, e.g., as calculated in the weighted average extraction unit 430.

In FIG. 5A, the color gamut center may be calculated through the extraction of the two outermost points, for example, of the color gamut for the input image and calculation of an average value of the two outermost points.

In detail, a center axis in the chromatic color space may be identified, e.g., connecting the white points for the light sources calculated in the gray region extraction unit 200, and points X0 and Y0 may be identified, e.g., which may be intersection points of an extension line of the center axis and the R/(R+G+B) and B/(R+G+B) axes. Points located the shortest distance from the point X0 to the center axis and from the point Y0 to the center axis, respectively, can become the two outermost points of the color gamut for the input image. That is, a point X1 located the shortest distance from the point X0 to the center axis and a point Y1 located the shortest distance from the point Y0 to the center axis become the outermost points, respectively. Accordingly, here, the color gamut center value corresponds to a reference numeral gm, a center value of the points X1 and Y1.

In FIG. 5B, when the average value, e.g., as calculated by the color gamut average calculation unit 420, is different from the center value, e.g., as calculated by the color gamut center calculation unit 410, the gray world assumption, stating that an average color becomes a gray color since a dominant color exists in a color gamut, can be violated. Thus, since there is a possibility that the calculated color gamut average value may not accurately represent the white information, the weighted average value may be identified through determination of the color gamut center value when the white information is calculated. As an example, the weighted average value can be calculated according to the below Equation 1.

$$r_{weighted} = (\alpha \times r_{ave} + \beta \times r_{gm})/(\alpha+\beta)$$

$$b_{weighted} = (\alpha \times b_{ave} + \beta \times b_{gm})/(\alpha+\beta) \quad \text{Equation 1}$$

Here, $r_{weighted}$ denotes the R/R+G+B value of the weighted average value, $b_{weighted}$ denotes the B/R+G+B value of the weighted average value, and $\alpha$ and $\beta$ denote constants. Further, $r_{ave}$ denotes the R/R+G+B value of the color gamut average value, and $b_{ave}$ denotes the B/R+G+B value of the color gamut average value.

As shown in Equation 1, e.g., in the weighted average extraction unit 430, the R/R+G+B value and B/R+G+B value of the weighted average value can reflect the color gamut center value on the color gamut average values, e.g., as calculated by the gamut average calculation unit 420. That is, if there exists a difference between the color gamut average value and the color gamut center value, the weighted average extraction unit 430, for example, can prevent the color gamut average value from being biased in any particular direction due to a dominant color of the color gamut by applying a weighting factor to the color gamut average value and the color gamut center value in order for the color gamut average value to move toward the color gamut center value, thereby enabling accurate initial light source information to be extracted.

For example, since the color gamut average value, as calculated by the gamut average calculation unit 420, has a value close to a yellow color rather than a gray color when a predominant color is the yellow color, in the color gamut as shown in FIG. 5B, the weighted average extraction unit 430 may extract a weighted average value obtained from moving the color gamut average value toward the color gamut center value by reflecting the color gamut center value on the calculated color gamut average value. Thus, the weighted average extraction unit 430 can prevent the initial light source information from being inaccurately extracted due to the existence of a dominant color rather than a conventionally preferred existence of different colors uniformly existing in the color gamut.

In FIG. 5C, the point 'a' denotes the weighted average value of the color gamut, e.g., as extracted by the weighted average extraction unit 430, the point 'b' denotes the point 'a' obtained when the weighted average value of the color gamut is mapped onto the light locus, i.e., the center axis connecting the white points for the light sources, and the point 'c' denotes a light source adjusted based on the mapped point b.

For extraction of the initial light source information, the weighted average value 'a' is vertically mapped onto the light locus. That is, a mapping point is assigned to be at an intersection point of the light locus and a straight line perpendicular to the light locus containing the weighted average value 'a'. Further, for minimization of errors when the weighted average value of each light source is mapped onto the white point for an original light source, the weighted average value mapped onto the light locus can be corrected and then the initial light source information extracted. See Equation 2 below.

$$r_{initial} = l \times r_{weighted}^2 + m \times r_{weighted} + n$$

$$b_{initial} = l' \times r_{weighted}^2 + m' \times r_{weighted} + n' \quad \text{Equation 2}$$

Here, $r_{initial}$ and $b_{initial}$ denote the initial light source information, with $r_{weighted}$ denoting the R/R+G+B value of the weighted average value and $b_{weighted}$ denoting the B/R+G+B value of the weighted average value. Further, l, m, and n, and l', m', and n' denote arbitrary constants. Equation 2 can be applied to adjust the weighted average value mapped onto the light locus when a distance between whites points of the light sources, located in the vicinity of the weighted average value mapped onto the light locus, is less than a certain value, for example.

Figure 6A:
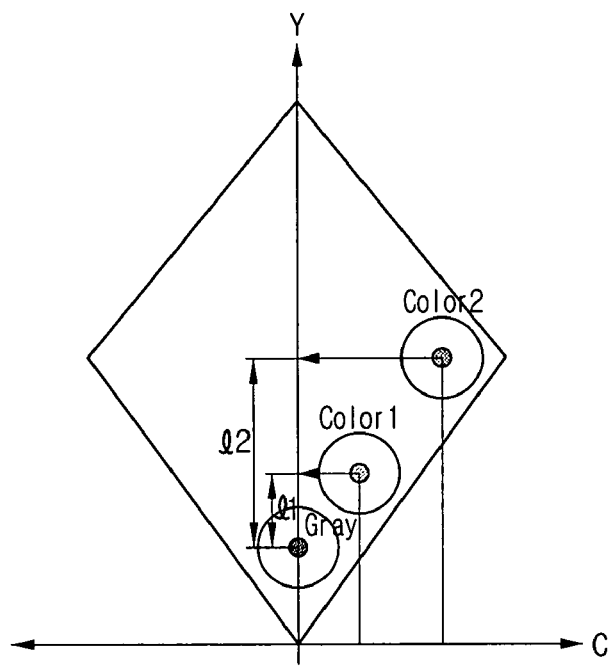
FIGS. 6A and 6B illustrate operations of an adjustment unit, such as that of FIG. 1, according to embodiments of the present invention.
Figure 6B:
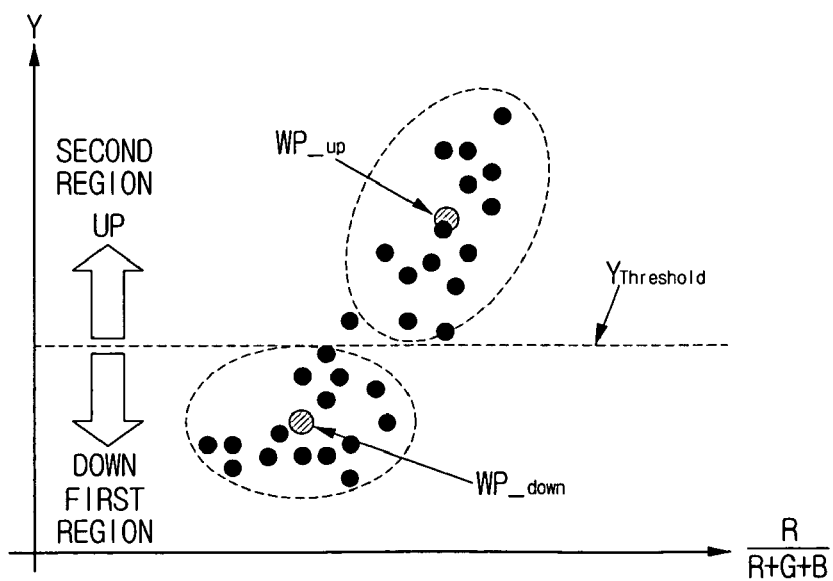

FIGS. 6A and 6B illustrate operations of an adjustment unit 500, such as that illustrated in FIG. 1, according to embodiments of the present invention.

For example, FIG. 6A illustrates an operation of the adjustment unit 500, adjusting the initial light source information according to luminance. Similarly, FIG. 6B illustrates an operation of the adjustment unit 500 extracting the final light source information by using average value of the regions divided based on luminance.

In FIG. 6A, the horizontal axis indicates the chromatic component, and the vertical axis indicates the luminance component. For extraction of the light source information, from which the chromatic component introduced into the gray region is removed, the gray region can be divided based on the luminance component, with the initial light source information being adjusted, and extracted in the light source information extraction unit 300, based on the color gamut average value of each divided region.

Further, as shown in FIG. 6A, in the adjusting of the initial light source information based on the luminance component, the color component may be located nearer a border of the color gamut as the chromatic values of the image data are increased. However, the color component comes nearer the Y axis as the gray values of the image data are increased. Accordingly, the gray region may be divided based on luminance into regions containing the chromatic component and regions not containing the chromatic component, since there is a difference between the gray component and the chromatic component, and the extracted initial light source information may be adjusted based on the gray regions into which the chromatic component is introduced.

For example, a second color may be located nearer to the color gamut border since the second color has a higher chromatic value compared to a first color. That is, the first color is located relatively near the luminance axis since the first color has a higher gray value compared to the second color. Here, there is a luminance difference between the first color and the second color, with the occurring luminance difference becoming l2−l1.

As illustrated in FIG. 6B, since there is a luminance difference between the gray component and the chromatic component, the gray region may be divided into the first region having low luminance values and the second region having high luminance values, based on a luminance value. Here, as illustrated, the horizontal axis indicates the R/R+G+B values and the vertical axis indicates luminance. FIG. 6B further illustrates that the gray region is divided based on luminance with respect to the R/R+G+B values, but the R/R+G+B and B/R+G+B values of the light source information, adjusted through the division of the gray region based on luminance, with respect to the B/B+G+B values, can be obtained.

Equation 3, as shown below, can be used to obtain a threshold luminance value for a reference to the division of the gray region into the first region and the second region.

$$Y_{threshold} = (\alpha \times Y_{region} + \beta \times Y_{ave})/(\alpha+\beta) \qquad \text{Equation 3}$$

Here, $Y_{threshold}$ denotes the threshold luminance value as a reference to the division of the gray region, $Y_{region}$ denotes an average value of the average values of the divided gray regions, $Y_{ave}$ denotes the average value of the gray region, and $\alpha$ and $\beta$ denote arbitrary constants.

As shown in Equation 3, the luminance value as a reference to the division of the gray region can be obtained based on the average value $Y_{region}$ of a maximum luminance value and a minimum luminance value and the color gamut average value $Y_{ave}$ of the entire gray region.

Based on the calculated threshold luminance value $Y_{threshold}$, the gray region can be divided into the first region having the low luminance value and the second region having the high luminance value. Further, the adjusted light source information can be obtained based on an average value of a white point WP_down, i.e., the color gamut average value of the first region, and a white point WP_up, i.e., the color gamut average value of the second region. Accordingly, the below Equation 4 can be used to obtain the light source information, as adjusted by the adjustment unit 500, for example.

$$r_{wht} = r_{down}, b_{wht} = b_{down} \text{ if } Dist_{up} > Dist_{down}$$

$$r_{wht} = r_{up}, b_{wht} = b_{up} \text{ if } Dist_{up} < Dist_{down} \qquad \text{Equation 4}$$

Here, $r_{wht}$ and $b_{wht}$ denote the R/R+G+B and B/R+G+B values of the white point value, i.e., the adjusted light source information, respectively. Further, $r_{down}$ and $b_{down}$ denote the R/R+G+B and B/R+G+B values of the average value of the first region, respectively, and $r_{up}$ and $b_{up}$ denote the R/R+G+B and B/R+G+B values of the average value of the second region, respectively. Further, $Dist_{up}$ and $Dist_{down}$ denote distances from a point detected based on the initial light source information, i.e. the point 'c' in FIG. 5C, to the average value of the second region and to the average value of the first region, respectively. Accordingly, the below Equation 5 can be used to obtain a distance from an initial light source information value to the average value of the first region and a distance from the initial light source information value to the average value of the second region.

$$Dist_{up} = \sqrt{(r_{initial} - r_{up})^2 + (b_{initial} - b_{up})^2}$$

$$Dist_{down} = \sqrt{(r_{initial} - r_{down})^2 + (b_{initial} - b_{down})^2} \qquad \text{Equation 5}$$

Here, $Dist_{up}$ and $Dist_{down}$ denote a distance from the initial light source information value to the average value of the second region and a distance from the initial light source information value to the average value of the first region, respectively, with $r_{initial}$ and $b_{initial}$ denoting the initial light source information values, e.g., as extracted by the light source information extraction unit 400. Further, $r_{down}$ and $b_{down}$ denote the R/R+G+B and B/R+G+B values of the average value of the first region, and $r_{up}$ and $b_{up}$ denote the R/R+G+B and B/R+G+B values of the average value of the second region, respectively.

As shown in the above Equation 3, the adjusted light source information becomes an average value, which is either the average value of the first region or the average value of the second region, having the shortest distance to the initial light source information value. The adjustment unit 500 may divide the gray region into the second region having high luminance values and the first region having low luminance values based on the calculated luminance threshold value, divide the gray region into a region into which chromatic components are introduced and a region into which the chromatic components are not introduced, and identify a white point for a region containing the initial light sources as the adjusted light source information. Accordingly, by identifying the white point for the gray region, into which chromatic components are not introduced, as the final light source information, the adjustment unit 500 can extract the light source information excluding chromatic components from initial light source information decided with the chromatic components introduced into the gray region.

On the other hand, since the second region, as a high luminance region, includes a highlighted region when the input image is an image having a single background color, the adjustment unit 500 may extract accurate light source information by adjusting the light source information on which a luminance value of the highlighted region is reflected. When the high luminance region corresponds to the divided gray region not containing a chromatic component, i.e., the divided gray region in which the initial light source information and the white point for the divided region have minimum values, the adjustment unit 500 can determine that the divided gray region contains the highlighted region.

Accordingly, the adjustment unit 500 may again divide the second region, which is a high luminance region in the gray regions, divided based on the threshold luminance value, into a region containing a highlighted region and a region not containing a highlighted region. The region containing a highlighted region can be a region corresponding to the top 20% of luminance of the second region, for example.

Here, the adjustment unit 500 may first decide whether or not a highlighted region is generated by the input image, and reflect a decision result on light source information for a white point for the highlighted region to be adjusted. The adjustment unit 500 can determine whether the highlighted region has been generated by the input image by checking whether or not an average luminance value of the highlighted region is smaller than a luminance value obtained from multiplying an average luminance value of the entire gray region by 3.5, for example.

If the average luminance value of the highlighted region is smaller than a luminance value obtained from multiplying the average luminance value of the entire gray region by 3.5, again noting this is only an example, the adjustment unit 500 may assign the average value of the highlighted region as the adjusted light source information. However, in this example, if the average luminance value of the highlighted region is larger than a luminance value obtained from multiplying the average luminance value of the entire gray region by 3.5, the adjustment unit 500 may assign the average value of the second region as the adjusted light source information.

FIG. 7 illustrates a white balance control method for an imaging apparatuses according to an embodiment of the present invention.

In FIG. 7, the input image data may be converted into data for a color space having a chromatic component (S901). In order to extract light source information and control white balance, the image data may be converted into a color space in which the image data can be separated into a chromatic component and an achromatic component, and properties changing RGB component ratios of gray colors can be used when a color cast occurs from light sources.

Such a color space can be an R/G and B/G plane having a fixed luminance or an R/R+G+B and B/R+G+B plane having a fixed luminance, for example. Hereinafter, description will be made on operations of converting the input image data onto an R/R+G+B and B/R+G+B plane having a fixed luminance and controlling white balance based on the extracted light source information.

Further, the image data may be obtained from sampling data captured by an image sensor, e.g., at certain intervals, with the sampled data being used in patching data based on an average value of data within a predetermined window.

Next, a gray region for an image apparatus may be extracted in the converted color space based on plural light sources and a color checker (S903), for example. In general, the plural light sources can be light sources D65, D50, CWF, and A, as examples, for an imaging apparatus, and the color checker can be the Macbeth color checker, noting that alternative embodiments are equally available.

In this example, the light sources may be used for extraction of gray regions for the light sources based on image data acquired from the Macbeth Color Checker, and a gray region for an imaging apparatus is extracted which contains all the extracted gray regions. In detail, the gray regions for light sources may be extracted based on an average value of gray patch data of the Macbeth color checker, and four straight lines may be formed to include all the extracted gray regions for the light sources, so that the gray region for an imaging apparatus can be extracted. Here, the accuracy of the gray region extraction for an imaging apparatus can be improved, with the number of the light sources increased, based on a non-linear method using a look-up table and the like rather than the four straight lines formed to include the gray regions for the light sources, noting again that alternative embodiments are also equally available.

Initial light source information may be extracted based on a color gamut center value and a color gamut average value of the input image (S905). In order to prevent violation of the gray world assumption, stating that an average value of an input image becomes a gray color when there exists a dominant color in an input image, calculations can be performed in order for the color gamut center value of the input image to be reflected. Since a large difference occurs between the color gamut average value of the input image and a color gamut center value of the input image when a dominant color exists in the input image, the weighted average value may be calculated through application of a weight value to the calculated color gamut average value and color gamut center value.

The calculated weighted average value may be vertically mapped, for example, onto a center axis connecting white points of the light sources in the gray region extracted in operation S903. That is, the weighted average value may be mapped onto a point at which a straight line and the center axis cross, the straight line containing the weighted average value among straight lines perpendicular to the center axis. Further, the initial light source information may be extracted through adjustment of the weighted average value mapped onto a light locus in order for errors to be minimized when the weighted average value of each light source is mapped onto a white point of an original light source.

The extracted initial light source information may be controlled based on the gray region to which a chromatic component is introduced (S907). Since the gray region for the input image is extracted based on a gray region for plural light sources, a region to which a chromatic component is introduced is used as a gray region for extraction of the light source information, rather than a gray region for light sources actually used. Accordingly, according to embodiments of the present invention, there is a desire to adjust the initial light source information extracted based on the gray region to which the chromatic component is introduced.

For adjustment of the initial light source information, it is beneficial to acknowledge that there exists a luminance difference between a gray component and a chromatic component. As described above with reference to FIG. 6A, upon luminance comparison of a gray component to a chromatic component on a plane having a chromaticity axis and a luminance axis, the gray component has a lower luminance value than the chromatic component in a region in which chromaticity is proportional to luminance, and the gray component has a higher luminance value than the chromatic component in the region in which the chromaticity is inversely proportional to the luminance.

Accordingly, since a luminance difference exists between the gray component and the chromatic component, the gray region may be divided based on a threshold luminance value, and, out of average values of the divided regions, an average value located near the initial light source information may be identified as the adjusted light source information. The gray region may be divided into a gray region containing a chromatic component and a gray region not containing a chromatic component based on the threshold luminance value, an average value of a divided region close to the initial light source information may be identified as the light source information, and an average value of the gray region not containing a chromatic component can be extracted as the adjusted light source information. Accordingly, the light source information can be extracted where a chromatic component has been introduced into the gray region has been excluded from.

Meanwhile, when an input image having a single background color is input, a gray region may not be divided into two regions based on one threshold luminance value, but a high luminance region may be divided again so that the initial light source information can be adjusted in order for an average value of luminance corresponding to a highlighted region to be reflected.

Gains to be applied to the input image may be calculated based on the adjusted light source information (S909). Data scaling may be performed over RGB data for each input image in order to exclude color temperature changes caused by light sources based on the extracted light source information. The gains used for the scaling of the RGB data for the input image can be obtained according to the below Equation 6, for example.

Equation 6

$$R_{gain} = f_{scaling} \times \frac{g_{wht}}{r_{wht}}$$

$$B_{gain} = f_{scaling} \times \frac{g_{wht}}{b_{wht}}$$

Here, $R_{gain}$ and $B_{gain}$ denote gain values to be applied to R and B, $f_{scaling}$ denotes a scaling factor, and $r_{wht}$ and $b_{wht}$ denote R/R+G+B and B/R+G+B values of a white point being the adjusted light source information. Further, $g_{wht}$ denotes a G value of light source information.

The calculated gains may be applied for image data control (S911). The white balance can be controlled by multiplication of R and B by $R_{gain}$ and $B_{gain}$, e.g., calculated in Equation 6, respectively. That is, the white balance for each input image can be controlled by $R'=R \times R_{gain}/f_{scaling}$, $G'=G$, $B'=B \times B_{gain}/f_{scaling}$.

Figure 8A:
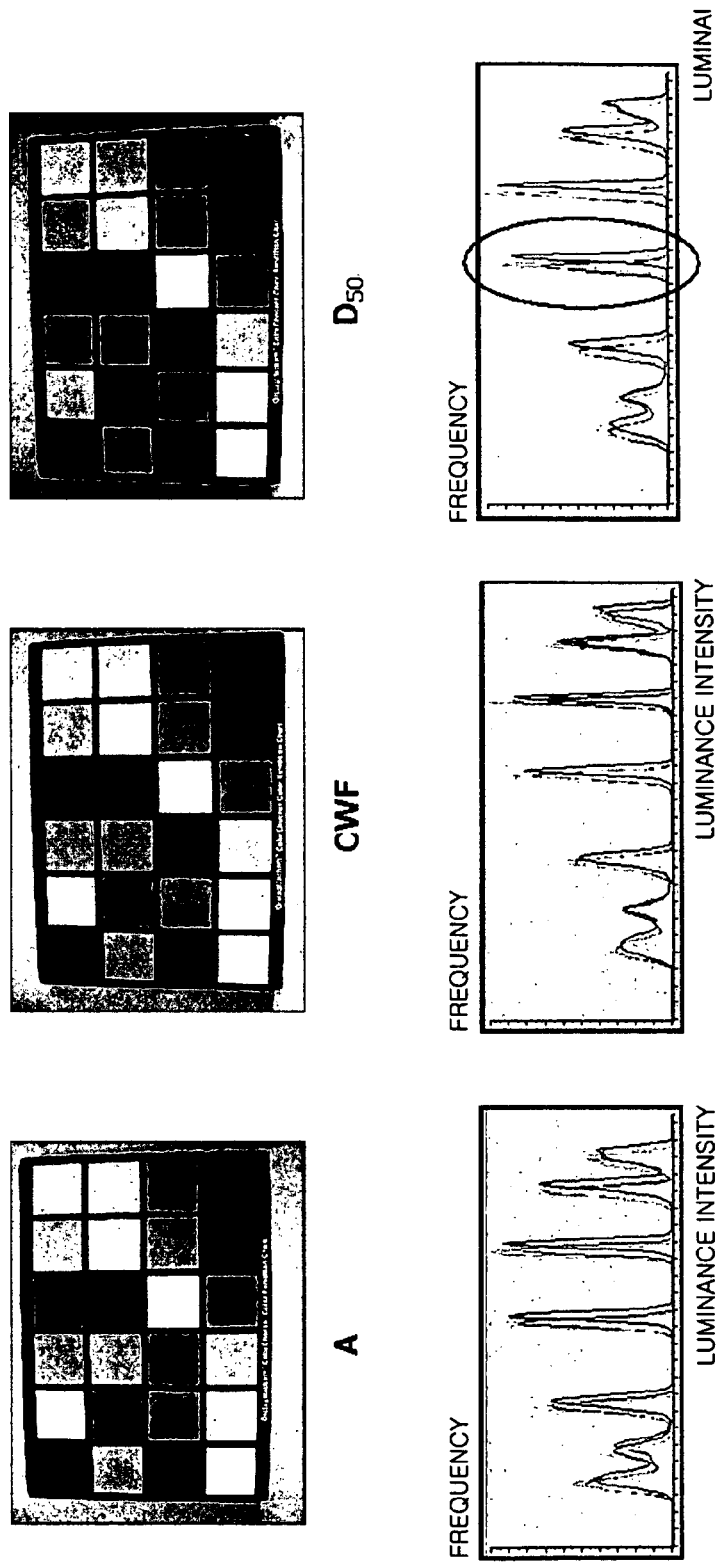

FIGS. 8A and 8B illustrate histograms for gray patches, according to an embodiment of the present invention. FIG. 8A illustrates histograms for gray patches to which a conventional white balance control method is applied, and FIG. 8B shows histograms for gray patches to which a white balance control method according to the present invention is applied.

In FIGS. 8A and 8B, in result images for the Macbeth color checker, to which a conventional white balance control method may be applied, RGB components are unevenly distributed in FIG. 8A histograms since the white balance is not accurately adjusted over histogram distribution of gray patches. However, FIG. 8B illustrates that RGB components maintain balance therebetween in images to which a white balance control method according to the present invention is applied.

As explained above, embodiments of the present invention can improve the accuracy of white balance by detecting light source information having a minimized effect of a chromatic component introduced into a gray region and by adjusting the white balance.

Further, embodiments of the present invention can prevent light source information from being inaccurately detected due to an existence of a dominant color in a color gamut by calculating a color gamut average value based on a color gamut center value when detecting a gray region used for the detection of the light source information.

In addition to the above described embodiments, embodiments of the present invention can also be implemented through computer readable code/instructions in/on at least one medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), for example. The media may also be a distributed network, so that the computer readable code is stored/transferred and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus with automatic white balance control, comprising:
   a color space conversion unit to convert input image data captured by an image sensor into color space data having a chromatic component;
   a gray region extraction unit to extract a gray region for the input image data based on gray regions identified in the input image, the identified gray regions being respectively identified in the input image relative to respective plural light sources in the input image and based on a predetermined color checker;
   a detection unit to extract initial light source information by using a color gamut average value and a color gamut center value of the input image data, and adjust the initial light source information to exclude a chromatic component introduced into the extracted gray region by using a determined existence of a luminance difference between a gray component and the chromatic component; and
   a gain control unit to calculate gains to be applied to scale the input image data based on the adjusted initial light source information, and control a white balance of the input image data by applying the calculated gains to the input image data.

2. The apparatus of claim 1, further comprising a signal-processing unit for signal-processing and displaying the white-balanced input image.

3. The apparatus of claim 1, further comprising a charge coupled device (CCD), with the CCD being the image sensor and providing the input image data.

4. The apparatus of claim 1, wherein the color space is either a color space having a luminance (Y) axis, an R/R+

G+B axis, and a B/R+G+B axis or a color space having a luminance (Y) axis, an R/G axis, and a B/G axis.

5. An apparatus with automatic white balance control, comprising:

a color space conversion unit to convert input image data captured by an image sensor into color space data having a chromatic component;

a gray region extraction unit to extract a gray region for the input image data based on identified gray regions, the gray regions being identified in the input image based on plural light sources related to the input image and a predetermined color checker;

a detection unit to extract initial light source information by using a color gamut average value and a color gamut center value of the input image data, and adjust the initial light source information to exclude a chromatic component introduced into the extracted gray region by using a determined existence of a luminance difference between a gray component and the chromatic component; and a gain control unit to calculate gains to be applied to scale the input image data based on the adjusted initial light source information, and control a white balance of the input image data by applying the calculated gains to the input image data, wherein the gray region extraction unit detects a white point for each light source based on an average value of gray patch data obtained by using the plural light sources, detects a certain range about a respective white point for each light source as a respective gray region of each light source, and extracts a region including all the gray regions for the plural light sources as the gray region of the input image.

6. An apparatus with automatic white balance control, comprising:

a color space conversion unit to convert input image data captured by an image sensor into color space data having a chromatic component;

a gray region extraction unit to extract a gray region for the input image data based on identified gray regions, the gray regions being identified in the input image based on plural light sources related to the input image and a predetermined color checker;

a detection unit to extract initial light source information by using a color gamut average value and a color gamut center value of the input image data, and adjust the initial light source information to exclude a chromatic component introduced into the extracted gray region by using a determined existence of a luminance difference between a gray component and the chromatic component; and a gain control unit to calculate gains to be applied to scale the input image data based on the adjusted initial light source information, and control a white balance of the input image data by applying the calculated gains to the input image data, wherein the detection unit comprises:

a light source information extraction unit to calculate a weighted average value on which the color gamut average value is reflected, based on the color gamut average value and color gamut center value of the input image, and extract the initial light source information based on the weighted average value; and an adjustment unit to divide the gray region into a first region of low luminance and a second region of high luminance by using the determined existence of the luminance difference between the gray component and the chromatic component, and adjust the initial light source information based on an average value of the first region and an average value of the second region.

7. The apparatus of claim 6, wherein the light source information extraction unit vertically maps the weighted average value onto a center axis connecting white points of the plural light sources, corrects the weighted average value mapped onto the center axis based on movement enabling errors to be minimized when mapping a weighted average value of each light source onto a white point for each light source, and extracts the corrected weighted average value as the initial light source information.

8. The apparatus of claim 6, wherein weighted average values are calculated according to:

$$r_{weighted}=(\alpha \times r_{ave}+\beta \times r_{gm})/(\alpha+\beta)$$

$$b_{weighted}=(\alpha \times b_{ave}+\beta \times b_{gm})/(\alpha+\beta),$$

where, $r_{weighted}$ denotes an R/R+G+B value of the weighted average value, $b_{weighted}$ denotes a B/R+G+B value of the weighted average value, $\alpha$ and $\beta$ denote constants, respectively, $r_{ave}$ denotes an R/R+G+B value of the color gamut average value, and $b_{ave}$ denotes a B/R+G+B value of the color gamut average value.

9. The apparatus of claim 6, wherein the adjustment unit divides the gray region into the first region and the second region based on a threshold luminance value determined by using an average value of maximum and minimum values in the gray region and an average value of the gray region, and adjusts the initial light source information by using the average value of the first region and the average value of the second region.

10. The apparatus of claim 9, wherein the threshold luminance value is calculated according to:

$$Y_{threshold}=(\alpha \times Y_{region}+\beta \times Y_{ave})/(\alpha+\beta),$$

where, $Y_{threshold}$ denotes the threshold luminance value, $Y_{region}$ denotes an average value of the average values of the first and second regions, $Y_{ave}$ denotes the average value of the gray region, and $\alpha$ and $\beta$ are an arbitrary constants.

11. The apparatus of claim 9, wherein the adjustment unit selectively detects, as the adjusted light source information, either the average value of the first region or the average value of the second region located according to a shortest distance to the initial light source information.

12. The apparatus of claim 11, wherein the adjusted light source information is calculated according to:

$$r_{wht}=r_{down}, b_{wht}=b_{down} \text{ if Dist}_{up}>\text{Dist}_{down}$$

$$r_{wht}=r_{up}, b_{wht}=b_{up} \text{ if Dist}_{up}<\text{Dist}_{down},$$

where, $r_{wht}$ and $b_{wht}$ denote R/R+G+B and B/R+G+B values of the adjusted light source information, respectively, $r_{down}$ and $b_{down}$ denote R/R+G+B and B/R+G+B values of the average value of the first region, and $r_{up}$ and $b_{up}$ denote R/R+G+B and B/R+G+B values of an color gamut average value of the second region, respectively, and $\text{Dist}_{up}$ and $\text{Dist}_{down}$ denote a distance from the initial light source information to the average value of the second region and a distance from the initial light source information to the average value of the first region, respectively.

13. An apparatus with automatic white balance control, comprising:

a color space conversion unit to convert input image data captured by an image sensor into color space data having a chromatic component;

a gray region extraction unit to extract a gray region for the input image data based on identified gray regions, the gray regions being identified in the input image based on plural light sources related to the input image and a predetermined color checker;

a detection unit to extract initial light source information by using a color gamut average value and a color gamut center value of the input image data, and adjust the initial light source information to exclude a chromatic component introduced into the extracted gray region by using a determined existence of a luminance difference between a gray component and the chromatic component; and a gain control unit to calculate gains to be applied to scale the input image data based on the adjusted initial light source information, and control a white balance of the input image data by applying the calculated gains to the input image data, wherein the gains are calculated according to:

$$R_{gain} = f_{scaling} \times \frac{g_{wht}}{r_{wht}} \qquad \text{Equation 6}$$

$$B_{gain} = f_{scaling} \times \frac{g_{wht}}{b_{wht}},$$

where, $R_{gain}$ and $B_{gain}$ denote gains to be applied to a red color R and a blue color B, respectively, $f_{scaling}$ denotes a scaling factor for scaling the input image, $g_{wht}$ denotes a green value of the adjusted light source information, and $r_{wht}$ and $b_{wht}$ denote R/R+G+B and B/R+G+B values of the adjusted light source information, respectively.

14. The apparatus as claimed in claim 13, wherein the gain control unit controls the white balance for the input image by multiplying the red color R of the input image by a reciprocal number of the scaling factor and the calculated gain of the red color R and multiplying the blue color B of the input image by the reciprocal number of the scaling factor and the calculated gain of the blue color B.

15. An automatic white balance control method, comprising:

converting input image data captured by an image sensor into color space data having a chromatic component;

extracting a gray region for the input image data based on gray regions identified in the input image, the identified gray regions being respectively identified in the input image relative to respective plural light sources in the input image data and based on a predetermined color checker;

extracting initial light source information by using a color gamut average value and a color gamut center value of the input image data, and extracting final light source information by adjusting the initial light source information to exclude a chromatic component introduced into the extracted gray region by using a determined existence of a luminance difference between a gray component and the chromatic component; and calculating gains to be applied to scale the input image data based on the adjusted final light source information, and controlling a white balance of the input image data by applying the calculated gains to the input image data.

16. The method of claim 15, further comprising signal-processing and displaying the white-balanced input image.

17. The method of claim 15, further comprising providing the input image data from a charge coupled device (CCD) as the image sensor.

18. The method of claim 15, wherein the color space is either a color space having a luminance (Y) axis, an R/R+G+B axis, and a B/R+G+B axis or a color space having a luminance (Y) axis, an R/G axis, and a B/G axis.

19. An automatic white balance control method, comprising:

converting input image data captured by an image sensor into color space data having a chromatic component;

extracting a gray region for the input image data based on identified gray regions, the gray regions being identified in the input image based on plural light sources related to the input image data and a predetermined color checker;

extracting initial light source information by using a color gamut average value and a color gamut center value of the input image data, and extracting final light source information by adjusting the initial light source information to exclude a chromatic component introduced into the extracted gray region by using a determined existence of a luminance difference between a gray component and the chromatic component; and calculating gains to be applied to scale the input image data based on the adjusted final light source information, and controlling a white balance of the input image data by applying the calculated gains to the input image data, wherein the extracting of the gray region comprises:

detecting a white point for each light source based on an average value of gray patch data obtained by using plural light sources; and extracting, as the gray region of the input image, a region including all respective gray regions for the plural light sources by detecting a certain respective range about a white point of each respective light source as a respective gray region of each light source.

20. An automatic white balance control method, comprising:

converting input image data captured by an image sensor into color space data having a chromatic component;

extracting a gray region for the input image data based on identified gray regions, the gray regions being identified in the input image based on plural light sources related to the input image data and a predetermined color checker;

extracting initial light source information by using a color gamut average value and a color gamut center value of the input image data, and extracting final light source information by adjusting the initial light source information to exclude a chromatic component introduced into the extracted gray region by using a determined existence of a luminance difference between a gray component and the chromatic component; and calculating gains to be applied to scale the input image data based on the adjusted final light source information, and controlling a white balance of the input image data by applying the calculated gains to the input image data, wherein the extracting of the final light source information comprises:

calculating a weighted average value on which the color gamut average value is reflected, based on the color gamut average value and color gamut center value of the input image data, and extracting the initial light source information based on the weighted average value; and dividing the gray region into a first region of low luminance and a second region of high luminance by using the determined existence of the luminance difference between the gray component and the chromatic component, and adjusting the initial light source information based on average values of the first region and an average value of the second region.

21. The method of claim 20, wherein the extracting of the light source information further comprises vertically mapping the weighted average value onto a center axis connecting white points of the plural light sources, correcting the weighted average value mapped onto the center axis based on movement enabling errors to be minimized when mapping a weighted average value of each light source onto a white point for each light source, and extracting the corrected weighted average value as the initial light source information.

22. The method of claim 20, wherein the weighted average values are calculated according to:

$$r_{weighted} = (\alpha \times r_{ave} + \beta \times r_{gm})/(\alpha+\beta)$$

$$b_{weighted} = (\alpha \times b_{ave} + \beta \times b_{gm})/(\alpha+\beta),$$

where, $r_{weighted}$ denotes an R/R+G+B value of the weighted average value, and $b_{weighted}$ denotes a B/R+G+B value of the weighted average value, $\alpha$ and $\beta$ denote constants, respectively, $r_{ave}$ denotes an R/R+G+B value of the color gamut average value, and $b_{ave}$ denotes a B/R+G+B value of the color gamut average value.

23. The method of claim 20, wherein the adjusting of the initial light source information comprises dividing the gray region into the first region and the second region based on a threshold luminance value decided by using an average value of maximum and minimum values in the gray region and an average value of the gray region, and adjusting the initial light source information by using the average value of the first region and the average value of the second region.

24. The method of claim 23, wherein the threshold luminance value is calculated according to:

$$Y_{threshold} = (\alpha \times Y_{region} + \beta \times Y_{ave})/(\alpha+\beta),$$

where, $Y_{threshold}$ denotes the threshold luminance value, $Y_{region}$ denotes an average value of the average values of the first and second regions, $Y_{ave}$ denotes the average value of the gray region, and $\alpha$ and $\beta$ denote arbitrary constants.

25. The method of claim 23, wherein the adjusting of the initial light source information comprises detecting as the adjusted light source information either the average value of the first region or the average value of the second region located in a shortest distance to the initial light source information.

26. The method of claim 25, wherein the adjusted light source information is calculated according to:

$$r_{wht} = r_{down}, b_{wht} = b_{down} \text{ if } Dist_{up} > Dist_{down}$$

$$r_{wht} = r_{up}, b_{wht} = b_{up} \text{ if } Dist_{up} < Dist_{down},$$

where, $r_{wht}$ and $b_{wht}$ denote R/R+G+B and B/R+G+B values of the adjusted light source information, respectively, $r_{down}$ and $b_{down}$ denote R/R+G+B and B/R+G+B values of the average value of the first region, and $r_{up}$ and $b_{up}$ denote R/R+G+B and B/R+G+B values of an color gamut average value of the second region, respectively, and $Dist_{up}$ and $Dist_{down}$ denote a distance from the initial light source information to the average value of the second region and a distance from the initial light source information to the average value of the first region, respectively.

27. An automatic white balance control method, comprising:
converting input image data captured by an image sensor into color space data having a chromatic component;
extracting a gray region for the input image data based on identified gray regions, the gray regions being identified in the input image based on plural light sources related to the input image data and a predetermined color checker;
extracting initial light source information by using a color gamut average value and a color gamut center value of the input image data, and extracting final light source information by adjusting the initial light source information to exclude a chromatic component introduced into the extracted gray region by using a determined existence of a luminance difference between a gray component and the chromatic component; and
calculating gains to be applied to scale the input image data based on the adjusted final light source information, and controlling a white balance of the input image data by applying the calculated gains to the input image data,
wherein the gains are calculated according to:

$$R_{gain} = f_{scaling} \times \frac{g_{wht}}{r_{wht}} \quad \text{Equation 6}$$

$$B_{gain} = f_{scaling} \times \frac{g_{wht}}{b_{wht}},$$

where, $R_{gain}$ and $B_{gain}$ denote gains to be applied to a red color R and a blue color B, respectively, $f_{scaling}$ denotes a scaling factor for scaling the input image, and $r_{wht}$ and $b_{wht}$ denote R/R+G+B and B/R+G+B values of the adjusted light source information, respectively.

28. An automatic white balance control method, comprising:
converting input image data captured by an image sensor into color space data having a chromatic component;
extracting a gray region for the input image data based on identified gray regions, the gray regions being identified in the input image based on plural light sources related to the input image data and a predetermined color checker;
extracting initial light source information by using a color gamut average value and a color gamut center value of the input image data, and extracting final light source information by adjusting the initial light source information to exclude a chromatic component introduced into the extracted gray region by using a determined existence of a luminance difference between a gray component and the chromatic component; and
calculating gains to be applied to scale the input image data based on the adjusted final light source information, and controlling a white balance of the input image data by applying the calculated gains to the input image data,
wherein the controlling of the white balance comprises controlling the white balance for the input image by multiplying the red color R of the input image by a reciprocal number of the scaling factor and the calculated gain of the red color R and multiplying the blue color B of the input image by the reciprocal number of the scaling factor and the calculated gain of the blue color B.

29. At least one computer readable medium comprising computer readable code to control at least one processing device to implement the method of claim 15.

30. The apparatus of claim 1, wherein the gray region extraction unit detects a white point for the plural light sources based on gray patch data obtained by using the plural light sources, and detects a range about a respective detected white point for each light source as a respective identified gray region of each light source.

31. The method of claim 15, wherein the extracting of the gray region includes detecting a white point for the plural light sources based on gray patch data obtained by using the plural light sources, and detecting of a range about a respective detected white point for each light source as a respective identified gray region of each light source.

* * * * *